Jan. 17, 1956  E. HERBERT  2,731,598
APPARATUS FOR TRACING UNDERGROUND CABLES
AND DETECTING FLAWS THEREIN
Filed Aug. 17, 1951  4 Sheets-Sheet 1
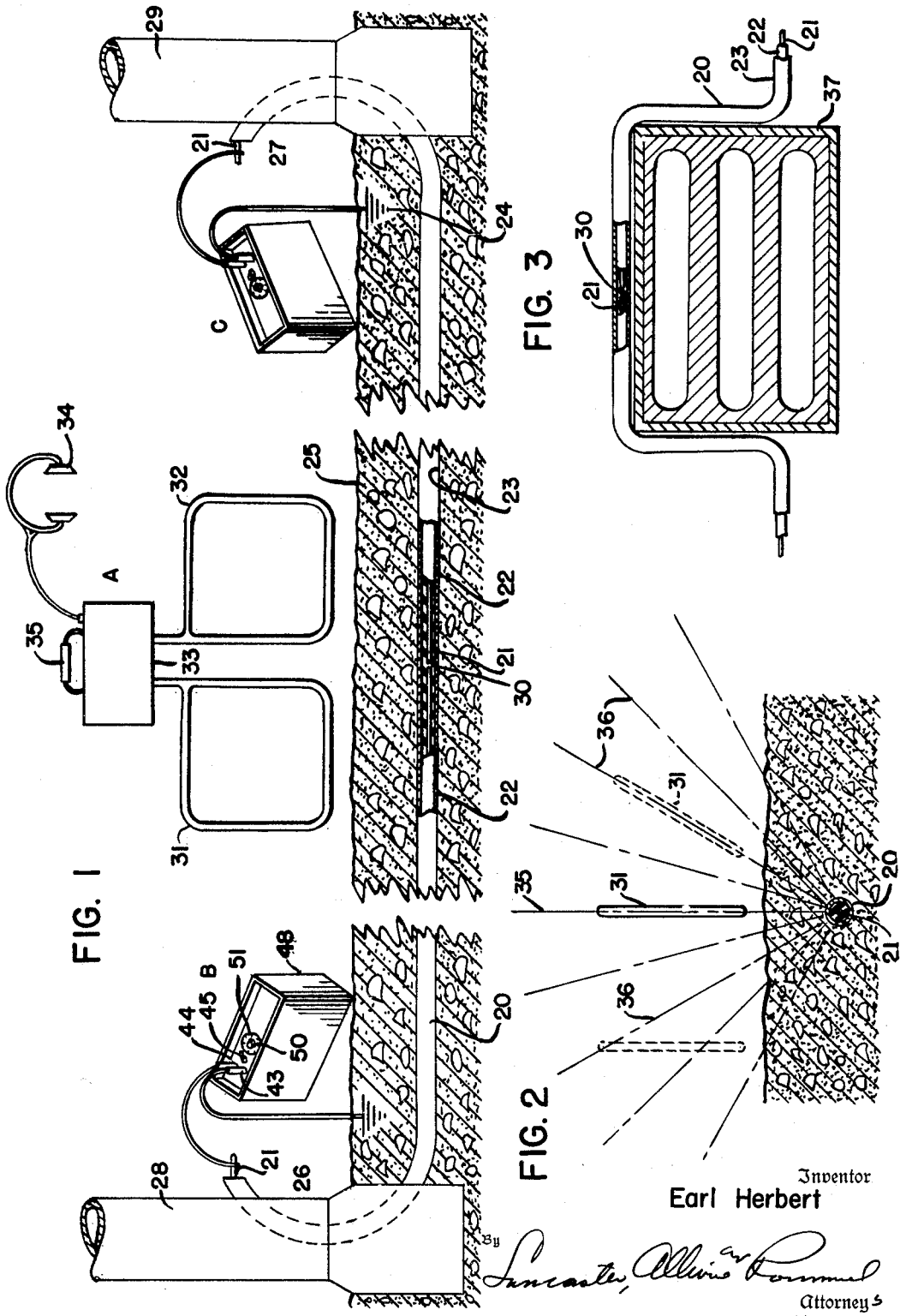
Inventor
Earl Herbert Jan. 17, 1956  E. HERBERT  2,731,598
APPARATUS FOR TRACING UNDERGROUND CABLES
AND DETECTING FLAWS THEREIN
Filed Aug. 17, 1951  4 Sheets-Sheet 2
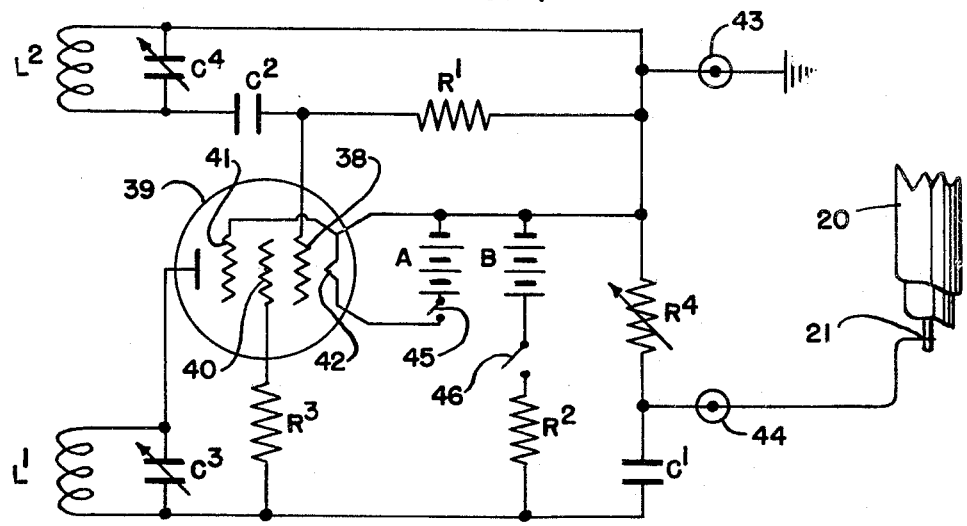
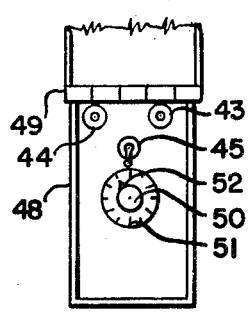
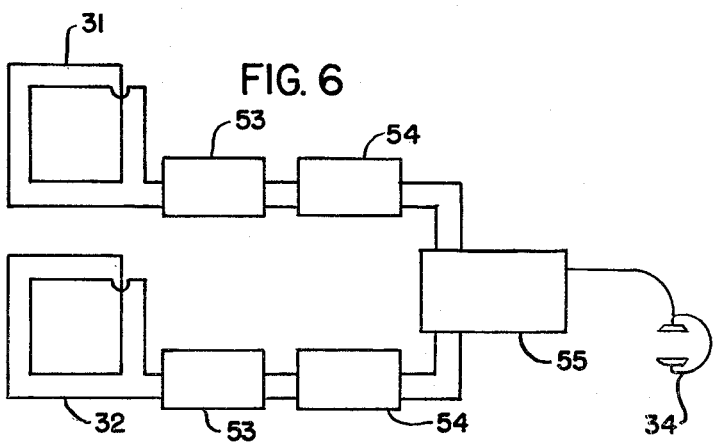
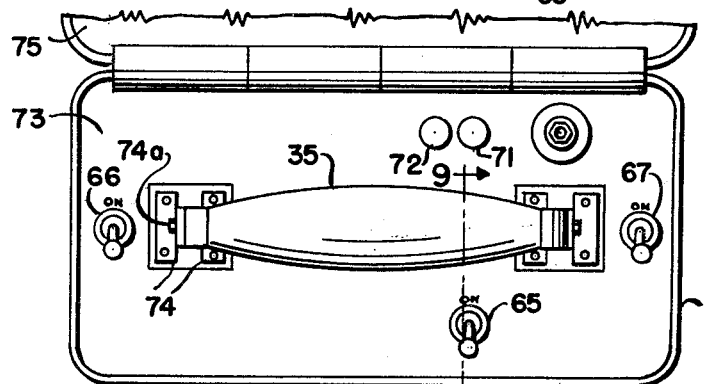
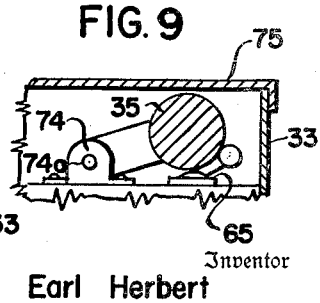
Inventor
Earl Herbert

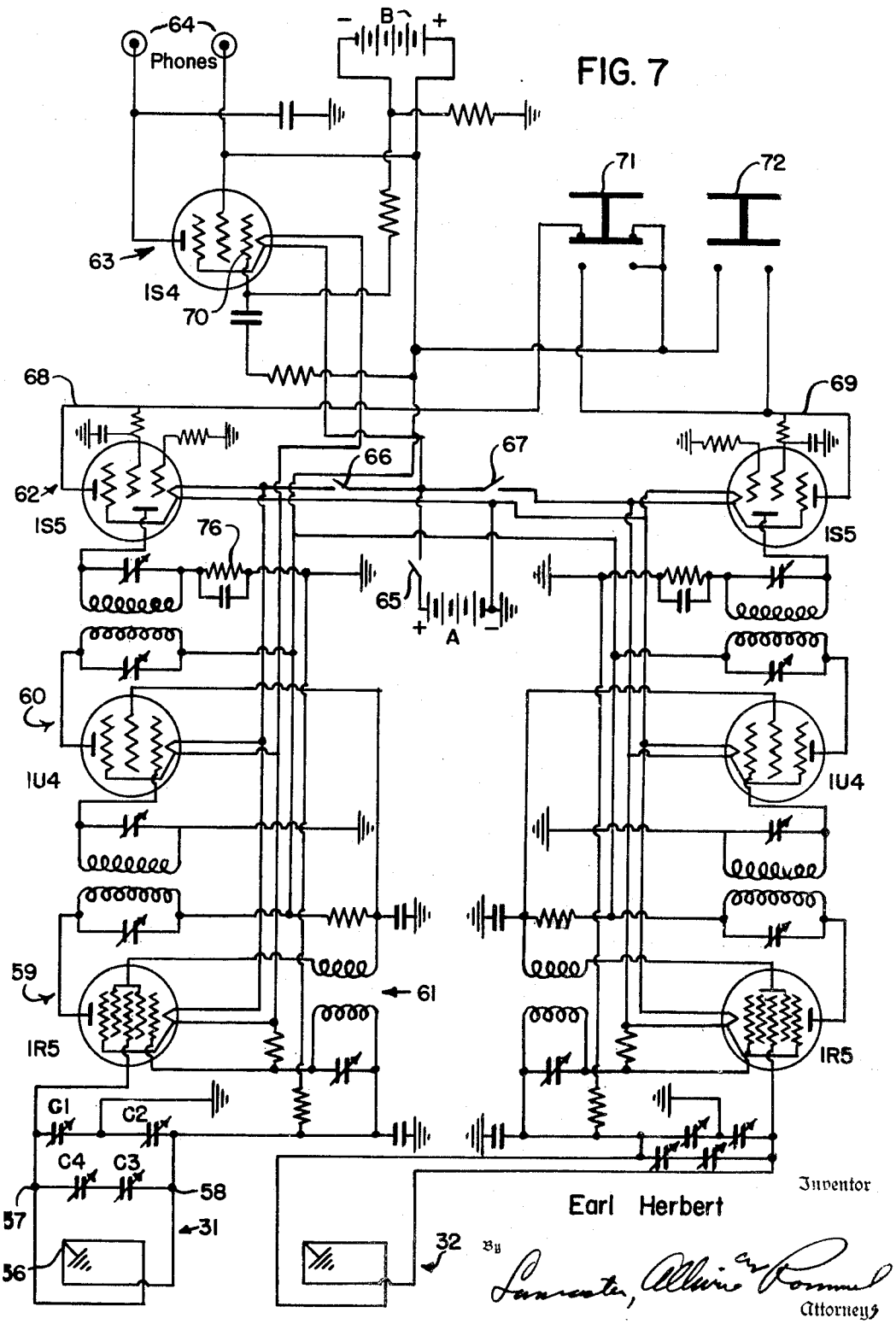

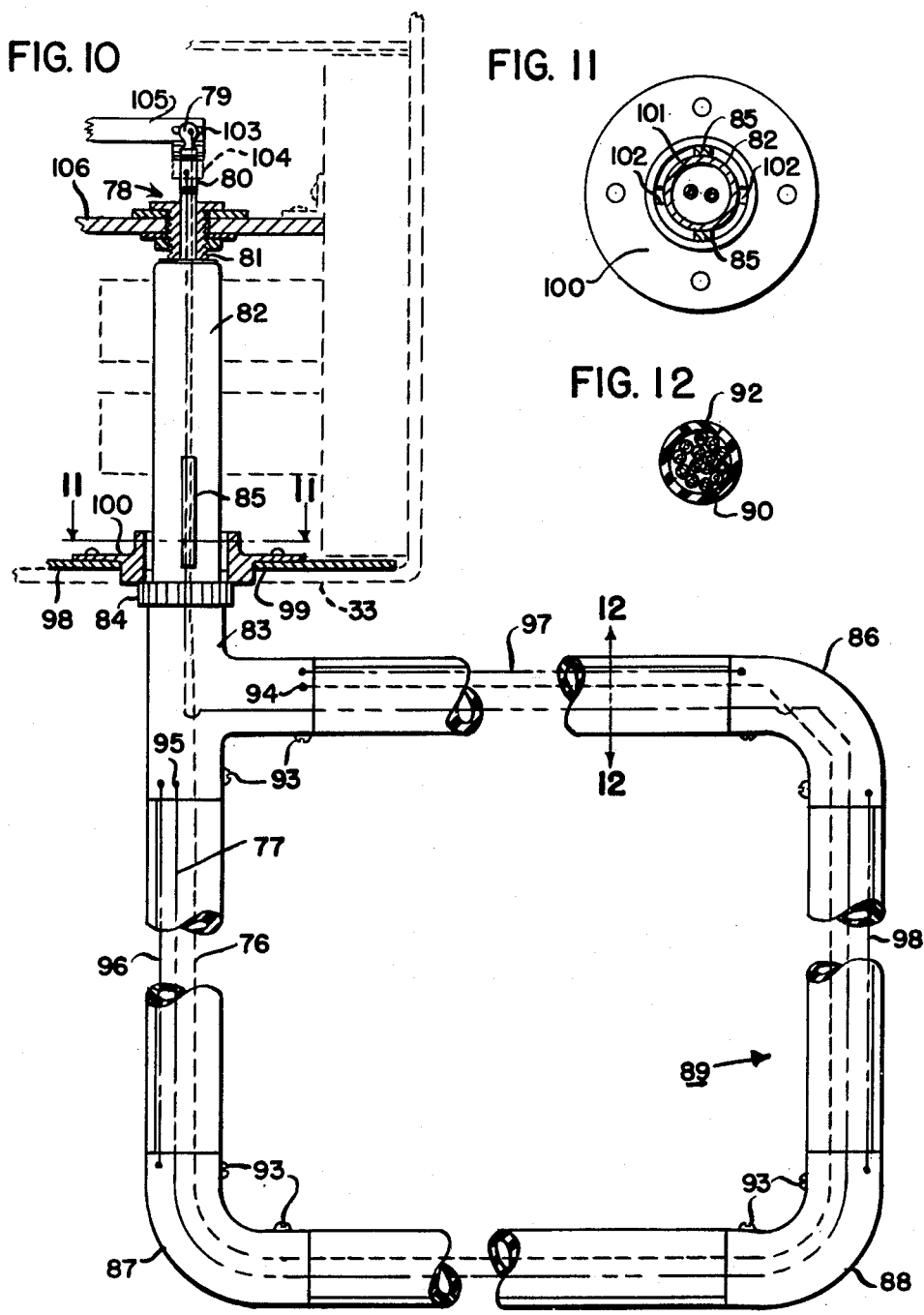

United States Patent Office 2,731,598
Patented Jan. 17, 1956

2,731,598
APPARATUS FOR TRACING UNDERGROUND CABLES AND DETECTING FLAWS THEREIN

Earl Herbert, St. Joseph, Mo., assignor of one-fourth to Elliot Marshall, one-fourth to Ivan Thomas and one-fourth to Whitney W. Potter, St. Joseph, Mo.

Application August 17, 1951, Serial No. 242,197

6 Claims. (Cl. 324—52)

This invention relates to apparatus for tracing underground cables and detecting breaks, grounds and other faults which may occur in such cables. The invention is particularly applicable to power transmission cables, lighting systems and the like in cities and populated areas where the cables are laid underground and frequently have to pass around water and sewer system conduits and even under such pipes, rails and the like. In such cases the conduits are not always laid in straight lines but have to make rather sharp bends, and it follows they are not laid at uniform depth. Such systems frequently employ high voltages that is, for example, 2300 volts and often higher and the cables employed are highly insulated and usually encased in lead tubing, however grounds, breaks and other defects do occur and it is the primary purpose of this invention to provide apparatus for tracing such cables and detecting flaws which may occur therein to very close proximity of the defects and affords a very high degree of accuracy.

In the past to find the source of trouble, or in other words the place the cable is shorted out or grounded out, or current leaking, or defects that would cause inefficient operation of the circuit, it has been generally necessary to dig up the pavement, or earth or whatever the cable is under, from one end to the other to find the trouble. This method is very expensive, a waste of time and requires the patching of the street as well as numerous other disadvantages. It is always necessary to protect the public from the place of operation and where so much of the street is torn up it makes a long time operation, and it is all to a disadvantage. Also the street is without light.

In accordance with my invention, by use of the novel apparatus, the portion of the circuit or length of cable under test is isolated from the remainder of the system and signal generators are connected with the cable and ground at both ends of the circuit to transmit into the cable signal frequencies of different frequencies. A detector, having detecting coils and receiving circuits for each of the frequency which may be employed alternately or simultaneously is carried above ground to traverse the path of the cable so that either or both frequencies are detected and the course of the cable and point of the flaw may be detected with a very high degree of accuracy and the position of the flaw within a very few inches or even fractions of an inch. This apparatus has proven highly practical on numerous tests made during the development of the equipment even though the cable may have been at a considerable depth under ground, subjected to bends and adjacent to or under metallic objects.

Thus the instruments as disclosed in the accompanying drawings and hereinafter described in detail overcome numerous disadvantages as it is only necessary to carry one instrument along the ground or pavement, and the place of trouble is located within a few inches. Also, it is only necessary to make a hole big enough to make the repair, and that is the only place that needs patching.

Among other objects of my invention is to provide in such a cable flaw detector system signal generators which transmit different high frequency oscillating currents and a traversing detecting instrument with its detecting pick-up coils and detector circuits for separately picking up and detecting the different high frequencies and converting them into audible frequencies of different pitches.

Another object of the invention is to provide means whereby either of said high frequencies may be employed separately or both simultaneously.

Another object of the invention is to provide in such a traversing detecting instrument pick-up coils which are angularly adjustable in vertical planes with respect to each other and the instrument.

Another object of my invention is to provide an improved type of oscillator for transmitting signal frequencies to be picked up by the traversing detector in a manner so as not to interfere with or be influenced by the frequencies of the power transmission systems or other frequencies in general use and the signal frequencies of which may be readily detected and converted into audible frequencies by the circuits in the traversing detector instrument. Frequencies of 175 kc. and 262 kc. have been employed for the purpose and found highly satisfactory.

Another object of the invention is to provide new and improved pick-up detector amplifier and frequency conversion circuits for cooperation with such transmitted signal frequencies in the traversing detector instrument so that numerous measurements with respect to traversing and flaw detecting in underground transmission cables may be conducted with a high degree of precision.

Further features, objects and advantages of my improved cable traversing and flaw detecting apparatus will appear in the following specification wherein a highly satisfactory form of my invention is described in detail and illustrated in the accompanying drawings forming a part of this specification.

In the drawings:

Fig. 1 is a schematic diagram illustrating the principles of the cable traversing and flaw detecting apparatus in accordance with my invention.

Fig. 2 is a fragmentary diagram illustrating the manner in which detecting coils operate during use of the apparatus.

Fig. 3 is a fragmentary diagram illustrating a lead sheathed underground cable with a break or other flaw and one of numerous conditions which may exist in the laying of such cables in the ground.

Fig. 4 is a wiring diagram of a signal generator employed in the system in accordance with my invention.

Fig. 5 is a top plan view of the signal generator housed in a practical form of case with the cover open to show the accessibility of the connectors and operating controls necessary during the operation of the system.

Fig. 6 is a diagrammatic disclosure of the detector instrument.

Fig. 7 is a circuit diagram of the detector instrument.

Fig. 8 is a top plan view of the detector instrument with the cover open to show the accessibility of the controls for the detector and amplifying circuits and plug connector element for the telephone head set type of indicating instrument.

Fig. 9 is a fragmentary vertical sectional view taken on line 9—9 of Fig. 8, with the cover in closed position.

Fig. 10 is a portion of the detector instrument and its casing in section into which the pick-up coil is pivotally supported.

Fig. 11 is a cross sectional view taken substantially on line 11—11 of Fig. 10.

Fig. 12 is a transverse sectional view of one of the pick-up coil members taken on line 12—12 of Fig. 10.

In general the instruments employed in accordance with my invention include one traversing detector unit A, or receiver and two transmitting oscillators, B and C, employed as signal generators.

In Fig. 1 these instruments are schematically shown associated with a cable 20 including a copper conductor 21, insulation 22 and lead sheath 23 comprising an isolated length of conductor in a power circuit to be explored with the traversing detector A. As shown this lead sheathed cable may be laid in the ground 24 and under usual paving 25 with the ends thereof coming up into connection stations 26 and 27 such as lamp posts 28 and 29 or in any other terminal connecting locations.

The signal generators B and C or transmitting oscillators are connected with the ends of cable conductor 21 and with ground at the respective ends of the cable and operate to transmit electrical oscillations of different frequencies through the conductor from the ends of the cable thereby energizing the conductor from the ends of the cable outwardly from the stations and toward each other thereby setting up the two fields of influence of different alternating frequencies which may each extend from end to end of the cable, or terminate at the intermediate point where a flaw such as a break or grounding of the conductor 21 may occur, as at 30.

With the cable 20 thus energized by the two oscillators B and C transmitting different frequencies the course of the cable may be traced and position of the defect can be detected with the traversing detector A carried above ground over the cable.

The traversing detector A has two pick-up coils 31 and 32 rotatably mounted for turning on vertical axes extending downwardly from the instrument case 33. These pick-up coils correspond with the two signal generators B and C and are connected with detector and amplifier circuits within the casing 33 of the detector unit as will be described in detail hereinafter. The two circuits, as will appear, are independent and are arranged for connection alternately or simultaneously with an indicating instrument 34, preferably as shown as a telephone head set for audibly detecting the energy picked up by the test coils. The traversing detector is provided with a handle 35 by means of which it may be carried along the course of the cable by the party listening to audible indications as produced by the signal generators, B and C and the traversing detector may be positioned over the cable as desired at a height above ground to suit the operator, turned from end to end and the pick-up coils 31 and 32 may be swung to any desired angle with respect to each other and the casing 33 while the traversing operation is being conducted. While further description of the operation will appear hereinafter it will suffice here to state that the strength of the transmitted signal operations may be increased or diminished and that in the event of a flaw at the point 30 one signal frequency will terminate and on the other side the other frequency will influence the corresponding detecting circuit. Thus, the position of the flaw may be determined with a high degree of precision.

In principle the detector coil 31 is carried so as to be in a radial plane, vertically as shown in full lines in Fig. 2 over the cable 20, for receiving the maximum signal frequency therefrom, the intensity of the signal frequency being received being reduced when the coil is positioned to a side of the vertical radial plane of the cable as shown in dotted lines at the left hand side, the vertical radial plane being indicated by the vertical line 35 and other planes radiating from the conductor 21 being indicated by relatively light lines 36. The receptions of the radiations being at a maximum when the test coil is positioned in a radial plane. By tilting the coil 31 at an angle as shown in dotted lines at the right hand side, the depth of the cable may be determined.

Fig. 3 represents a cable 20 wherein a flaw 30 actually occurred, the cable having been laid on the earth partly around an iron sewer top 37, the bends in the cable following a curb line necessitated by the presence of the sewer top as an obstruction to the straight laying of the cable. The rotary mounting of the detector coils afforded a means whereby the course of the cable could easily be traced and the position of the flaw determined where the cable went around the iron sewer top. The presence of the lead sheathing 23 of the cable or other metal objects under, at the side or over the cable has been found not to interfere with the successful tracing of the cables and detection of flaws therein.

The successful operation of the apparatus in accordance with my invention is naturally dependent upon efficient signal generators B and C and a sensitive traversing detector unit A and the assembly of such instruments into practical forms for conducting such cable tracing and flaw detecting operations. In accordance with my invention the signal impulses are transmitted through the conductor in the cable under test, the traversing detector in turn picks up such signal impulses from above ground over the cable, and such detected impulses are detected and amplified so to give audible signals in a telephone head set which may be worn by the tester, while his hands are free to carry the detector for traversing the course of the cable. An important feature in accordance with my invention is the transmission of high frequency currents through the cables, picking up such signals with the traversing detector, detecting and converting the same to audio frequencies of the desired pitch frequency and amplifying the same for audio indications in a telephone receiver. In practice two different high frequency generators or oscillators are employed, each of a different high frequency and the traversing detector has two detecting and amplifying circuits corresponding to the two oscillators and the audio frequencies therefrom are of correspondingly different frequencies. Either or both of these frequencies are imposed on the telephone head set. An advantage of such arrangement is that the signals are transmitted more effectively throughout a cable length (to a flaw) under better control as to intensity so that when picked up and detected the signals are stronger and outside influences are completely eliminated.

As explained it is desirable to subject the cable conductor 21 to two distinct high frequency signal currents and to accomplish this the transmitting oscillators B and C are provided for producing such high frequency oscillations as diagrammatically shown in Fig. 4 and in plan view of a preferred construction in Fig. 5.

The wiring diagram in Fig. 4 illustrates an improved oscillation generator. In accordance with my improved arrangement the grid oscillating circuit (inductance $L_2$ and variable condenser $C_4$) is connected with the control grid 38 of a vacuum tube 39 through the grid leak and condenser $R_1$ and $C_2$ respectively, and the plate oscillating circuit (inductance $L_1$ and variable condenser $C_3$) is connected with a screen grid 40 of the tube 39 through a resisatnce $R_3$ which is satisfactorily 22,000 ohms. Vacuum tube 39 has a suppressor grid 41 which is connected with the grounded side of its filament 42. In practice a miniature receiving pentode R. F. amplifier tube type 1U4 has proven highly satisfactory for the oscillation generators providing small and compact units employing miniature A and B batteries housed within their cases and yet producing ample signal strength for the purpose. The B battery for the purpose is 67½ volts and is connected through a reactance in the form of a RFC choke $R^2$ or blocking resistance of 1200 ohms. The grid oscillating circuit is provided with a terminal 43 for grounding one side of the output circuit and the terminal 44 of other side thereof is connected through a condenser $C^1$ (.5 mfd.) with the plate oscillating circuit. A variable gain control resistor $R^4$ is connected between the output terminals for varying the output signal strength. The A battery is provided with a switch 45 for cutting off the current to filament 42 and if desired a switch 46 may be provided for cutting off the B potential until the tube is fully heated though in the type of tube employed such a switch is not essential.

Referring to Fig. 5 wherein a plan view of the oscillator is shown in a case 48 with its cover 49 in open position and partly broken away, all the connections and controls necessary during a test are shown to be readily accessible. In this construction it will be seen that the only connections accessible are the output terminals 43 and 44 for connection with the ground and the conductor 21 of cable 20. As to controls, the on and off switch 45 for the A battery and the knob 50 for the gain control variable resistance R4 are the only ones accessible. The remaining controls for adjusting the frequency are all made and set before the equipment is taken into the field for tests.

It will be seen that two such oscillators may be adjusted to the desired frequencies, as for example 175 kc. and 262 kc. have been found highly satisfactory for the purpose in actual practice, being below the frequency range of radio broadcasting so there is little likelihood of interference. The oscillations produced by my improved oscillators are of superior quality for the purpose due to the grid controls on both oscillating circuits and the action of the suppressor grid. Further by means of variable gain control resistance $R^4$ the output signal strength may be adjusted and the signal strength of both of the oscillators B and C may be adjusted and equalized with respect to each other.

These gain control resistors $R^4$ are provided with graduated dials 51 so that the signal strength of the output may be regulated as indicated by the pointer 52 on the knob 50 so that when the setting is the same on each unit the output will be substantially the same. For example, if the conductor under test had the grounded place much closer to one light standard than the other one, then on the signal generator that has the farthest distance to carry, the control $R^4$ will be adjusted for a stronger output, and the generator at the close end will be retarded by the control of $R^4$ of that generator. This circuit is designed to maintain its full power of oscillation, and the movement of control $R^4$ just controls the amount of strength that is impressed on the conductor under test.

In determining these dial settings by the traversing detector A so that the signal strength is equalized the dial settings of the two instruments will give an approximate proportional distance from the oscillators to a break in the cable so that the approximate location of the flaw in a straight cable length may be determined. However for precise location of the flaw and in order to trace the course of the cable it must be traversed with the detector instrument A.

Detector instrument A or the traversing detector, is shown diagrammatically in the simple block disclosure in Fig. 6, and the circuit diagram. Fig. 7 more specifically discloses the improved features of the detecting and amplifying circuits which have been highly satisfactory in the practice of my invention.

Referring to Fig. 6 it will be seen that the two pick-up coils 31 and 32 each have their separate amplifier and detector units 53 and 54 and these feed into a common audio amplifier 55 with which the audio head set 34 is connected.

The specific circuit arrangements and controls however, are shown in Fig. 7 in which it will be seen that the general circuit arrangements for the two pick-up coils 31 and 32 are the same. Each pick-up coil is provided with a grounded mid tap 56 with variable condensers $C_1$ and $C_2$ connected to the ends 57 and 58 of the coils respectively and ground and a pair of such small variable condensers $C_3$ and $C_4$ in series are connected across the ends of the coils. The pick-up coils feed into two states of high frequency 59 and 60 tuned to the frequencies of the oscillators B and C respectively, and stimulated by a tuned tickler circuit 61. The high frequency oscillations from these amplifiers are fed into a detector stage 62 and then, selectively or simultaneously, to an audio amplifier stage 63 and thence to the phone terminals 64, or phone jack. As in the oscillators B and C miniature glass base tubes are employed, types 1U4 and 1R5 are satisfactory for the high frequency amplifiers, 1S5 or 1L4 for the detector and 1S4 for the audio amplifier, requiring but small A and B batteries which can be housed in the case of the traversing detector.

It will be seen that the A battery supply has a common or master control switch 65, which when closed energizes the filament of the audio stage 63 and individual and independent switches 66 and 67 are in the circuits for the filaments of the high frequency amplifier and detector stages for the respective pick-up coils 31 and 32 which may be selectively or simultaneously closed for heating the filaments of either or both sets of amplifier and detector circuits.

The plate circuits 68 and 69 of the two detector stages may be selectively or simultaneously connected with the control grid 70 of the audio frequency amplifier stage 65 by means of switches 71 and 72. It will be seen that these switches are preferably push button type switches normally in their upper position, switch 71 closing the detector plate circuit 68 with the control grid 70 of the audio amplifier in such upper position and when depressed it opens that circuit and closes the detector plate circuit 69 with the control grid 70 instead. Switch 72, which is normally open, may be depressed so as to close the same circuit, detector plate circuit 69 with control grid 70 in which case the amplifiers and detectors of both pick-up coils 31 and 32 are connected with the amplifier control grid 70 simultaneously.

As shown in the plan view of the traversing detector A in Fig. 8, the top panel 73 of the instrument fits snugly into the instrument case 33 and has pairs of handle mounting lugs 74 connected by pivot bolts 74ª upon which the ends of handle 35 are pivotally connected so that it may be swung downwardly onto the top 72 when the casing cover 75 is closed for storing the instrument. It will be noted that the main control switches 65, 66, 67, 71 and 72 for the amplifiers for the two pick-up coils 31 and 32 are conveniently positioned on the top panel and likewise the phone jack 64. A particular feature is the mid position of the master switch 65, which is of the usual toggle type and the same as switch 66 and 67 which are over the respective ends of the instrument corresponding with the pick-up coils 31 and 32 with which they are associated. With respect to master switch 65 it will be noted that it is so positioned that when handle 35 is swung to is lower panel engaging position, the handle will strike this switch 65 and throw it to its "off" position, as shown in Fig. 9.

Push button switches 71 and 72 for controlling the connections with the amplifier stage are also conveniently positioned for operation by the thumb of the hand of the operator holding the handle 35 for carrying the detector instrument. It is to be observed that with both switches up the left end pick-up coil and circuits therefor are in operation, and on depressing switch 71, the connections are changed so that the right end is in operation. However by depressing switch 72 both ends are in operation.

Thus it will be seen that the controls operate selectively so that either or both pick-up coils function to pick up the oscillations from the corresponding oscillators B and C, amplifying defects and converting the picked up frequencies to corresponding different audio frequencies, the audio frequencies depending on the tuning of the tickler circuits 61 and also responsive to the grid leak 76 of the detector stage 62. The volume of course is dependent on the strength of the oscillations of the sending oscillators B and C, distance and characteristics of the cable which is being traversed, as indications of defects, and of course the following or tracing of the cable with the pick-up coils at the proper angular relationship with respect thereto. This later means that the coils should occupy a radial plane passing through the conductor so as to receive a maximum signal strength as hereinbefore mentioned. Also by making the pick-up coils angularly adjustable with respect to the instrument case 33, and each other, a maximum efficiency in the operation of the apparatus is obtained, particularly where the cable does not follow a straight course.

The pick-up coils 31 and 32 each comprises a plurality of turns of wire in the form of a loop which may be circular, triangular or rectangular though preferably the latter as represented in Fig. 10 which shows a loop approximately a foot and a half wide and a slightly greater height. While the coil comprises sufficient number of turns to provide the required inductance to be tuned with condensers $C_1$ to $C_4$ for the wave lengths of the oscillators B and C respectively (175 kc. and 252 kc.) in this elevational view the winding is illustrated as of two turns 76 and 77 only and they are diagrammatically represented; of course each of these turns is representative of a number of turns, preferably the same number. The two coils are connected in series the connection providing a mid tap which is grounded as represented at 56 in Fig. 7 and the outer ends 57 and 58 of which coils are connected with the receiving circuits.

In Fig. 10 the connections of these coils is made in the receiver by means of a three element plug 78 including the tip end 79, an intermediate concentric ring 80 and base portion 81 all of which are insulated from each other in the usual manner of telephone plugs. The plug extends from a tubular shank 82 terminating in a T 83 and an intermediate collar member 84 providing a stop member and the sides of the shank are provided with diametrically opposed laterally extending keys 85. The T 83 provides one of the upper corner members and the other corners are in the form of elbows 86, 87 and 88, for the coil frame 89. The side frame elements 90 between said corner pieces may be plastic or other insulating material though wooden pieces providing a tubular passageway for the coils is found satisfactory. These side elements 90 may be grooved wooden pieces which after the windings are in place are closed by wooden sealing strips 92 as shown in Fig. 12. Screws 93 are shown in the ends of the corner pieces for securing the side elements and corner pieces assembled. The metal parts are preferably copper or other durable non-corrosive metal.

As represented the wiring connections in the pick-up coil frame include the coils represented by the turns 76 and 77 where one end of coil 76 is connected to the plug tip 79 extends through the frame and has its other end electrically connected with the T corner piece 83 as by soldering it at 94. The other coil 77 has its end soldered at 95 to the same T corner piece 83 and wound through the frame in the same direction and has its other end connected with the plug concentric ring 80 contact element. In addition corner piece 87 is connected by a conductor 96 with the T corner piece 83 and similar conductor connections 97 and 98 are made between T 83 and elbow 86, and elbow 86 and elbow 88 respectively; no connection is made between elbows 87 and 88 which would provide a short circuiting turn. Connections 96, 97 and 98 provide for grounding all the metal parts of the pick-up frame with the receiver circuit case or instrument mounting panels which afford the grounding for all the circuits of the receiver. After the frame is wound the closure strips 92 are secured in the grooves of the side elements and thus protects the wiring. While metal tubing frame structure with an insulated section may be used it is difficult to wind and the construction described has been found highly practical.

The keys 85 on shank 82 and stop 84 provide for the insertion and support of the pick-up coil in the receiver lower frame structure 98 and case 33. The case is provided with an aperture 99 providing access to a collar 100 mounted in the frame structure 98. This collar, as best shown in Fig. 11, has a flange suitably secured to the frame and its central aperture 101 and diametrically opposed slots 102 provide for the reception of the shank 82 and keys 85 to pass therethrough when the coil is turned to a ninety degree angle or sidewise, with respect to the receiver case 33, thus providing a bayonet joint connection for supporting the pick-up coil and permitting it to be turned substantially at right angles in either direction with respect to the longitudinal path of the detector.

When the pick-up coil is thus mounted in the receiver the plug elements 79 and 80 engage spring contact elements 103 and 104 respectively of a cooperating jack structure 105 mounted in an upper portion 106 of the receiver frame structure and the "grounded" element 81 and shank 82 engage metallic parts of the receiver frame structure to provide the necessary grounding contact between the pick-up coil mid tap 56 and other metal parts of the pick-up coil frame. The contacts 103 and 104 are connected with the control grid of the tube in the first amplifier stage 59 and with the grid return circuits as shown in Fig. 7. The tuning condensers $C_1$ to $C_4$ as shown in Fig. 7 are connected with these leads and are mounted on the respective ends and opposite sides of the receiver frame or chassis in positions (not shown) where they are accessible for tuning the pick-up coils to the frequencies of the oscillators B and C.

Thus each of the pick-up coils 31 and 32, is mounted so as to independently swing with respect to the receiver case 33 and each other and maintain the required electrical connections with the coil windings.

In connection with the pick-up coil input in each of the receivers the condensers $C_1$ to $C_4$ have been referred to as mounted on the ends and sides of receiver chassis for adjustment. Condensers $C_1$ and $C_2$ are connected between the terminals of the pick-up coils and ground so as to balance the chassis and metal parts on the pick-up coil, in reference to more capacity or less capacity to either end of the pick-up coil. Condensers $C_3$ and $C_4$ are used to tune the pick-up coil to resonance with the frequency generators B and C.

Thus the pick-up coils are separately tuned to the frequency generators for feeding into the control grid of the first amplifier tube of the respective receiver. While numerous types of receivers may be employed including a tuned radio frequency circuit a modified superheterodyne circuit such as illustrated in Fig. 7 has been found to have a slightly higher pick-up. Such circuits have been employed with cables laid three and a half feet in the ground and signals could be heard holding the set as high as possible to reach above ground.

Since the operation of the testing set is dependent upon variation in signal intensity in order to detect defects the modern radio receiving circuits with automatic volume control are not applicable for the purpose of my invention. The circuits employed, particularly as illustrated in Fig. 7, have been found to be highly sensitive for both tracing the course of underground conductors and for detecting grounds and other faults therein. The machine when used with one pick-up coil will follow the cable within a half inch on either side of the cable, and also one pick-up coil will get very close to a bad spot in the cable.

In operation of the instruments a signal generator is connected with an end of the cable as set forth and the traversing detector with the corresponding coil and receiving circuit energized is carried over the conductor and the signals will be picked up until the detector is close to the trouble spot and then the tone volume will drop off.

If the depth of the conductor is known, it is only necessary to use one signal generator connected to one end of the underground cable, and the tone will drop off sharply at the grounded spot and the spread of the signal's emissions can be determined.

However by the use of two pick-up coils with the two frequencies and the separate receivers for each of the pick-up coils the location of cables and faulty points are facilitated and the faulty point is located with greater accuracy, particularly if the depth of the cable is unknown as the tone wave from the generator spreads differently for varying depths. Thus by using both signal generators connected at opposite ends of the cable the oscillations of different frequencies are imposed on the cables, that is, from the ends out to the faulty or grounded point, and by employing the two pick-up coils with their detecting and amplifying circuits separately responsive to the two signal frequencies the grounded point in the cable conductor can be located with greater accuracy as in traversing the cable the tone from one generator will first be heard and as the grounded spot is approached the tone from this generator will begin to sound weaker and the tone from the other generator will begin to be heard. By moving the receiver with its two pick-up coils back and forth to pick up equal tone volume from each generator the indication will be that the receiver is directly over the spot where the conductor is grounded. As shown in Fig. 8 the position of switch 71 within access of the thumb of the operator's hand carrying the detector for alternate connection of the head set with the receiver circuits greatly facilitates the change over from one to the other pick-up as may be desirable in locating the point and similarly with respect to the adjacent switch 72 when it is desired to listen to both signal frequencies. Of course it is necessary that the master control switch 65 be closed and either or both switches 66 and 67 during the operation of the detector instrument.

Thus it is possible to energize either or both receiving circuits and also to switch either receiving circuit onto the audio amplifying circuit or both simultaneously so that the detector will be flexible in its operation and the location of defects may be determined with a high degree of precision.

As previously mentioned the control of the frequency generators B and C by means of the volume control resistances $R_4$ so that the signal frequencies for producing substantially the same tone volume in the receiver head set 34 will materially facilitate in the operations of tracing and locating faulty points. It will be noted that where the faulty point is nearer one end of the line than the other the settings of these gain control resistances $R_4$ to obtain the equal tone volumes in the head sets will be different, substantially in relation to the proportional distances the signal frequency generators are from the defect in the cable. Such equalizing of the tone volumes from the oscillators B and C on the two sides of the break in the cable before conducting a survey facilitates in detecting the point of a breakdown in the cable as the tone volume is substantially constant all the way from the oscillator along the cable to the point of the break where its volume drops off. Thus if the generators are adjusted so that their amplitude or volume is equal along the two sections it is easier to determine the faulty point.

The pivoting of the pick-up coils is a great advantage in following the course of a cable which has to be bent from a straight line to pass obstructions. It is to be noted that these pick-up coils function in a similar manner to direction finders and are balanced with the detector casing so that they are highly responsive to the course of the cable and of course tuned to the required frequency of the oscillators. The particular shape of the pick-up coils is immaterial, it is the area which is effective in picking up the signal frequencies and of course therefore a circular pick-up coil is best. However for practical purposes the rectangular formation is best as it is not only easier to construct but can be made to resist damage due to rough usage and it has proven to be highly satisfactory.

I claim:

1. Apparatus for tracing underground cables and detecting flaws therein including, electrical oscillation generators for producing different frequencies in a section of underground cable for connection with opposite ends thereof; detecting means for traversing the course of the cable above ground including two detecting circuits separately tuned for receiving the two corresponding oscillation frequencies applied to the ends of the cable section, a separate pick-up coil for each detecting circuit suspended from the detecting means, an indicator, and switching means for applying the detected oscillations of either of said detecting circuits to the indicator or both simultaneously.

2. Apparatus for tracing underground cables and detecting flaws therein, including a pair of high frequency electrical generators for delivering electrical oscillations of different frequencies into the ends of a section of cables to be tested; and a traversing detector instrument to be carried above ground for tracing the course of the cable, including a pair of pick-up coils, means for separately tuning said coils for separately picking up the oscillations of the high frequency generators, separate high frequency amplifier and detector stages for each pick-up coil, a common audio frequency amplifier, and switching means for selectively connecting either or both sets of amplifier and detector stages with the audio frequency amplifier.

3. In apparatus for tracing underground cables and detecting flaws therein as specified in claim 2, portable carrying cases for housing the high frequency generators and detector instrument, said cases also housing battery sources of operating potentials, and means wherein the pick-up coils are pivotally suspended from the case of the detector instrument and detachably connected therewith.

4. A traversing detector in accordance with claim 2 including a casing for housing the same and portable battery sources of electrical potential, a pivotally mounted handle for carrying the detector, a master control switch for controlling the vacuum tube filament heating current in the form of a toggle switch so positioned with respect to the carrying handle that when the handle is swung downward so that the case may be closed for storage it will engage the switch and insure that it is in its open position.

5. A pick-up coil for apparatus for tracing and detecting flaws in underground cables including a plurality of turns of wire having end terminals and a center tap, a grounding connection with the center tap, a variable capacity connected between each end terminal and ground for independently balancing the two sections of the pick-up coil, and variable capacity connected across the end terminals for tuning the pick-up coil to the required frequency.

6. A pick-up coil for apparatus for tracing and detecting flaws in underground cables including a frame structure of a plurality of sections having a coil receiving passageway, in each section, hollow metallic connecting elements for interconnecting the sections so that the passageways will be in the form of a loop, a plurality of turns of wire having end terminals and a center tap wound in the passageway of the frame structure, a connection grounding the center tap to said metallic connecting elements, a variable capacity connected between each end terminal and ground for independently balancing the two sections of the pick-up coil, and variable capacity connected across the end terminals for tuning the pick-up coil to the required frequency.

References Cited in the file of this patent

UNITED STATES PATENTS

| | | |
|---|---|---|
| Re. 16,651 | Clark | June 14, 1927 |
| 645,603 | Meyers | Mar. 20, 1900 |
| 659,357 | Athern | Oct. 9, 1900 |
| 1,340,193 | Ureeland | May 8, 1920 |
| 1,376,592 | Townsend | May 3, 1921 |
| 1,624,537 | Colpitts | Apr. 12, 1927 |

FOREIGN PATENTS

| | | |
|---|---|---|
| 577,080 | Great Britain | May 3, 1946 |

OTHER REFERENCES

Advertisement in "Instruments," page 243 of March 1949.